July 7, 1953 W. R. PETERSON 2,644,697
REVERSIBLE CASTERING WHEEL STRUCTURE
Filed April 18, 1951 2 Sheets-Sheet 1

POINT OF ROLLING
RESISTANCE C

DIRECTION OF TRAVEL

DIRECTION OF TRAVEL

Inventor:
Walter R. Peterson
By: Paul O. Pippel
Attorney

July 7, 1953 W. R. PETERSON 2,644,697
REVERSIBLE CASTERING WHEEL STRUCTURE
Filed April 18, 1951 2 Sheets-Sheet 2

Inventor:
Walter R. Peterson
By: Paul O. Pippel
Attorney

Patented July 7, 1953

2,644,697

UNITED STATES PATENT OFFICE 2,644,697

REVERSIBLE CASTERING WHEEL STRUCTURE

Walter R. Peterson, Hinsdale, Ill., assignor to International Harvester Company, a corporation of New Jersey Application April 18, 1951, Serial No. 221,689

5 Claims. (Cl. 280—80)

This invention relates to a castering wheel structure. More specifically, this invention relates to an improved mechanism for facilitating the reversal of direction of movement of a wheeled device or carriage having a castering wheel support.

In a castering wheel structure the ground wheel is usually journaled on a spindle which has a vertical portion turning about a vertical axis in a socket which is rigidly supported. The socket normally is set forwardly of the bearing or contact point of the wheel with the ground. Thus a vertical centerline through the socket would intersect the ground ahead of the contact point of the wheel, this contact point also being conventionally referred to as the center of rolling resistance. The point of rolling resistance thus is rearwardly of the vertical axle of the spindle and socket. This construction results in a castering or tracking of the wheel. In other words, the wheel follows in the direction of movement in a manner which is well known to those familiar with castering wheel assemblies. This castering facility is greatly desirable in many vehicle constructions and is especially useful in the construction of farm implements.

The foremost objection to a castering wheel construction is that the wheel will caster freely in one direction but upon a sudden reversal of direction difficulties will occur that to a great extent limit the usefulness of such a wheel. In order for a castering wheel to function properly on a sudden reversal of direction, the spindle will have to turn 180° within the socket so that the vertical centerline of the socket is ahead of the point of rolling resistance of the wheel. In other words the structural conditions which readily permit a wheel to caster in one direction will have to be reversed completely if it is desired to move the castering wheel in a reverse direction. The problems of quickly reversing a castering wheel structure are believed to be obvious. Due to uneven conditions the castering wheel may be subjected to lateral thrusts or forces that will cause the wheel to drag along the ground during turning of the spindle and thus the normal advantages of a castering structure may be completely eliminated. For example, assuming that the castering wheels are used in a vehicle such as a wagon or a truck, the castering wheels may be placed on the rear of the vehicle and in a forward direction of movement the castering wheel would follow or track behind the front wheels in a very desirable manner. Supposing however that the driver decides to reverse the vehicle's direction quite suddenly, the castering wheels would be ineffective since the center of rolling resistance of the wheels would still be at a point behind the intersection of the vertical centerline of the spindle and socket. This is a desirable condition, of course, from the standpoint of forward movement of the vehicle but is definitely a hindrance in reverse movement. Therefore, the spindle would have to turn in its vertical axis a full 180° to place the castering wheel point of rolling resistance in reverse to its former position so that the wheels would caster properly in a reverse direction. Considering then the many rapid rearward and forward movements that are necessary in controlling a vehicle, it can readily be seen that the conventional type of castering wheel would be in many instances ineffective and impractical for the purpose, especially in view of the inherent limitations of the conventional castering wheel which has been set forth. It is a prime object of the invention therefore to provide an improved castering wheel structure which will overcome the deficiencies above indicated.

A more specific object is to provide a quickly reversible castering wheel support wherein the point of rolling resistance of the castering wheel can quickly be reversed or changed to accommodate reversal of direction of movement of the castering wheels.

Still another object is to provide an axle for a castering wheel structure, the axle having a spindle connected thereto, the axle and spindle being instantaneously angularly tiltable to change the point of rolling resistance of the castering wheel and to arrange said wheel for castering movement in response to a reversal of direction of said wheel.

A still further object is to provide a castering wheel construction, the construction including a spindle journaled for turning movement about a vertical axis, the construction including means designed to provide for full castering action of the wheels during a reversal of direction of movement without substantial turning movement of the spindle.

Another object is to provide a castering wheel structure including a castering wheel journaled on an axle which is connected to a spindle, the spindle being connected to a horizontally extending support which is automatically tiltable about its horizontal axis for positioning the castering wheel in a castering position despite changes in a reversal of direction of movement.

A still further object is to provide a castering wheel construction adapted for use with a trailing vehicle, the construction including means adapted to position the castering wheels in castering relation during a quick reversal in the direction of movement of the vehicle.

These and further objects will become more readily apparent upon a reading of the specification when taken in connection with the accompanying sheets of drawings.

Figure 1:
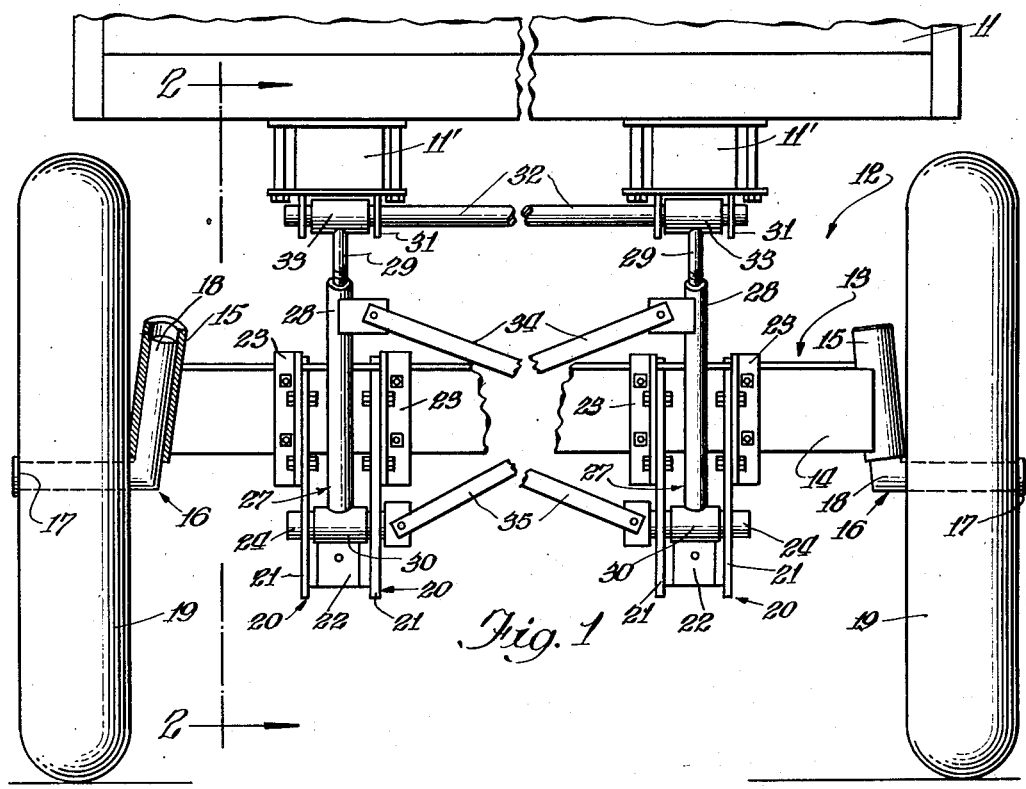
Fig. 1 is a rear view in elevation of the castering wheel structure connected to a vehicle.
Figure 2:
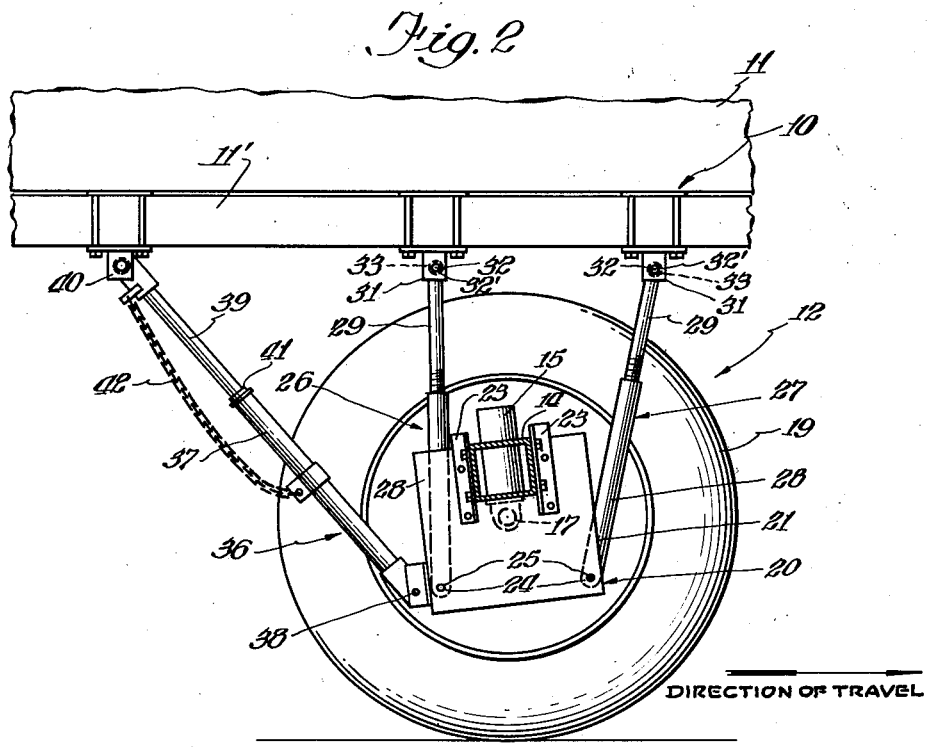
Fig. 2 is a cross-sectional view of the castering wheel structure taken substantially along the line 2—2 of Fig. 1.
Figure 3:
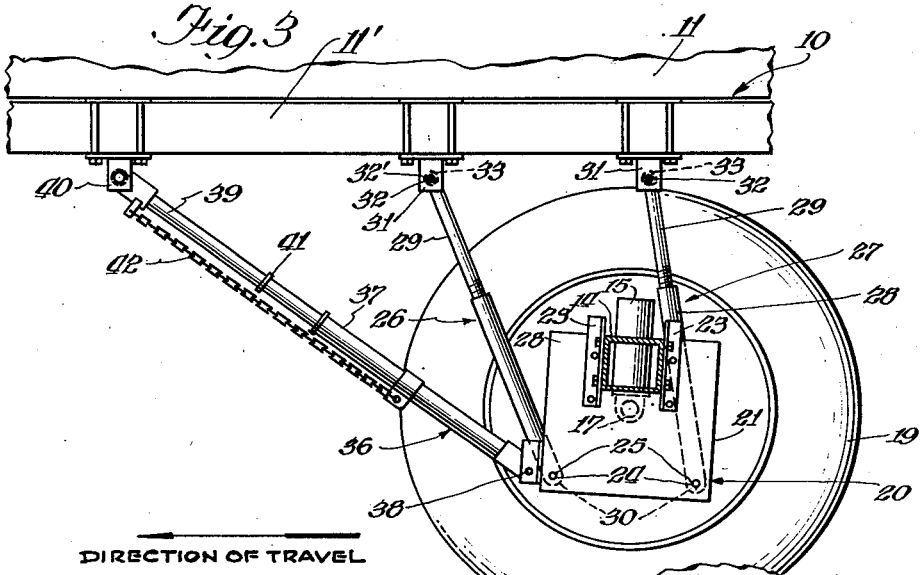
Fig. 3 is a sectional view similar to Fig. 2, this view showing the position of a castering wheel structure in elevation during reverse movement of a vehicle.

Referring particularly to Figs. 1, 2 and 3, a vehicle is generally designated by the reference character 10. The vehicle 10 comprises a longitudinal body 11, the body 11 including longitudinally extending supports or sills 11'. A wheel carriage 12 is connected to the vehicle body 11, the wheel carriage 12 including a castering wheel structure 13 generally designated. The castering wheel structure 13 includes an axle or support 14 which extends transversely with respect to the longitudinal body 11. A pair of socket or bearing members 15, as best shown in Fig. 1, are laterally spaced with respect to each other and are rigidly secured to the ends of the axle 14.

A spindle, generally designated by the reference character 16, is positioned on each of the bearing members 15. The spindle 16 includes a horizontal journal portion 17 extending laterally outwardly with respect to the longitudinal body 11. Each spindle 16 is also provided with a substantially vertical, or upright portion 18 which is, as best shown in Fig. 1, positioned in the socket 15 for swiveling or turning movement relative thereto. A pair of ground wheels 19 are journaled on the horizontal journal of each spindle 16. A pair of axle supports 20 are laterally spaced on the axle 14. The axle supports 20 each include a pair of transversely spaced vertical plates 21. The plates 21 are secured at their lower ends by means of channel portions 22. A plurality of angle sections 23 are rigidly connected to the axle 14 and the plates 21 are rigidly secured to the angles 23. The plates 21 at their forward and rearward portions support transversely extending pins 24 which are positioned within openings 25.

As best shown in Figs. 2 and 3, the castering wheel structure 13 is provided with laterally spaced front links 26 and with rear links 27. Each of the links 26 and 27 includes a tubular portion 28 which has a threaded rod 29 telescopingly threaded into said tubular portion. As best shown in Fig. 1, the tubular members or portions 28 are provided at their lower ends with a transversely extending sleeve 30. The sleeve 30 is journaled on the pins 24 so that the links 26 and 27 may have full free forward and rearward pivotal movement with respect to the axle supports 20. A plurality of hangers 31 project downwardly from the underneath side of the sills 11'. The hangers 31 are longitudinally and laterally spaced with respect to each other, as best shown in Figs. 1 and 2. Forward and rearward rods 32 extend transversely across the underneath side of the longitudinal body 11. Each rod 32 is supported in openings 32' of the hangers 31. As best shown in Figs. 1 and 2, upper sleeve members 33 are rigidly connected to the rods 29. The sleeve members 33 of each of the front links and rear links 26 and 27, respectively, are journaled on the rods 32. It can thus be seen that the axle supports 20 are pivotally or tiltably connected with respect to the longitudinal body 11 and the longitudinal sills 11'.

As best shown in Fig. 1, diagonally extending struts 34 and 35 are connected to the supports 20 in the manner shown. The diagonal strut 34 is connected to the tubular portion 28 of each of the rear links 27. The lower ends of the struts 34 and 35 are connected to the rearwardly disposed pins 24 in the manner indicated. The struts 34 and 35 serve to provide for lateral rigidity of the links 26 and 27, yet permitting them to freely and fully pivot with respect to forward and rearward movement, depending on the direction of movement of the ground wheels 19.

As indicated in Figs. 2, 3, 5 and 6, the axle and the spindle carried thereon are tiltable to a certain position depending on whether or not the vehicle is being drawn in a forward direction or whether the movement of the vehicle is reversed. A pair of telescoping struts 36 (only one of which is shown) are disposed on opposite sides of the vehicle, these struts 36 being connected to the axle supports 20 and to the longitudinal body 11. Each telescoping strut 36 consists of a first telescoping member 37. The telescoping member 37 is pivotally connected to the lowermost portion of the axle support 20 as best indicated at 38. A second telescoping member 39 is telescopingly connected to the first telescoping member 37. The telescoping member 39 is pivotally connected to a bracket 40 in turn rigidly secured to the sill 11'. A stop collar 41 is connected to the second telescoping member, and as best shown in Fig. 2, the stop collar 41 is adapted to engage the end of the first telescoping member 36 to limit the relative telescoping movement of the telescoping member. A chain 42 is connected to the first and second telescoping members and limits the extension of said members relative to each other.

Figure 4:
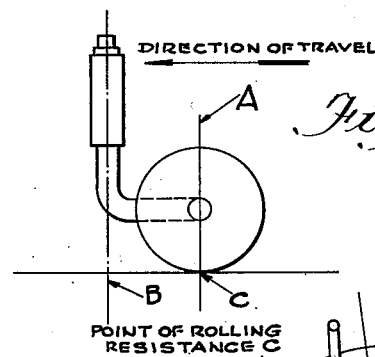
Fig. 4 is a diagrammatic side view of a conventional type of castering wheel construction.
Figure 5:
Fig. 5 is a diagrammatic view of a castering wheel structure showing the position of the wheel as it is moving in a forward direction.
Figure 6:
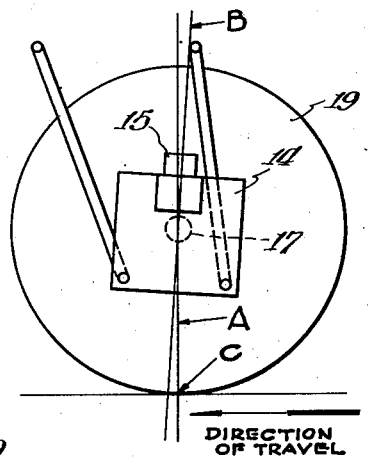
Fig. 6 is a diagrammatic view of a castering wheel embodying the principles of the invention, the wheel being shown in position of a reversal of direction of movement from the direction of movement shown in Fig. 5.
Figure 6:
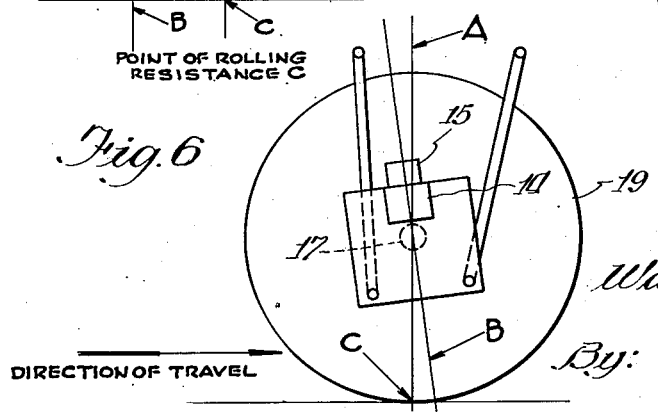

Referring now to Figs. 4, 5 and 6, the operation of applicant's novel improvement is clearly disclosed. As previously indicated, the conventional type of castering wheel construction has the vertical portion of the spindle disposed ahead of the contact point of the ground wheel with the ground. In other words, an axial centerline B through the vertical portion of the spindle is disposed ahead of the point of rolling resistance C, or, in other words, the contact point of the ground wheel with the ground line. This is especially exemplified in the conventional castering construction shown in Fig. 4. B is the centerline through the wheel, this centerline intersecting the ground at the point C which is the point of rolling resistance or the contact or bearing point of the castering wheel with the ground. A study of the geometry and forces involved will disclose in a more definite manner the reason why a castering wheel tracks or follows in a castering manner when the vertical centerline through the turning portion of the spindle is disposed ahead of the rolling resistance of the ground. It is believed, however, unnecessary to go into the theory and forces of this type of wheel construction since the advantages and operation of a castering wheel are obvious.

Referring to the castering construction shown in Fig. 4, it is obvious that upon the sudden reversal of the direction of movement of the vehicle, the castering wheel position would have to be completely reversed so that the point of rolling resistance C is placed rearwardly of the vertical centerline which extends through the axis of the vehicle portion of the spindle. This would be necessary, of course, to procure proper castering in a rearward direction. A sudden reversal of direction, however, with the conventional construction would not result in this reversal of positions. Irregular ground conditions causing lateral thrust forces would most likely result in frictional dragging of the wheel. More likely than not, the wheels would drag on the ground and a quick reversal of direction would not result in the free castering manner which is desired in a castering wheel construction.

Applicant by his improved castering wheel construction has solved the problems which are inherent in the conventional castering construction. As best shown in Figs. 2 and 5, the vehicle is traveling in a forward direction. The castering wheels are, of course, in engagement with the ground and the frictional drag on the wheels causes the axle supports 20 to shift on the front and rear pivotal links 26 and 27, respectively, to the position shown. Thus the axle 14 and the socket or bearing member 15 are tilted to the position shown. As the vehicle is traveling forwardly, the association of the links 26 and 27 with respect to the plates 21 causes the axle 14 to twist or tilt about its horizontal axis, thus pushing the lower ends of the plates 21 opposite the direction of movement to exend the telescoping strut 36. The chain 42 limits the extent to which the telescoping members 37 and 39 may be extended and thus the telescoping strut 36 serves to limit the tilting movement of the axle 14.

Referring particularly now to Fig. 5, it can be seen that a true castering situation exists. The centerline B which is an axial centerline through the vertical axis of the substantially vertical portion of the spindle and the socket intersects the ground line at a point ahead of the rolling resistance C or point contact of the wheel 19 with the ground. Thus the condition which is present is similar to the condition shown in Fig. 4, wherein a true castering construction is provided.

The operator may now wish to quickly reverse the direction of movement of the vehicle and still maintain the desired castering movement of the rear wheels 19. Upon reversal of the vehicle, the castering wheel structure assumes the position shown best in Figs. 3 and 6. As the vehicle 10 is moved rearwardly, the ground wheels 19 are, of course, in frictional engagement with the ground, the axle 14 is thereupon turned or slightly rotated about its horizontal axis in a manner to tilt the same to the position shown in Fig. 3. This tilting action is a result of the pivotal connection of the links 26 and 27, the axle is tilted to a position opposite to the position shown in Fig. 2. Upon this rearward movement of the vehicle, the telescoping strut 36 is in the retracted position as shown in Fig. 3, the stop 41 having moved against the end of the telescoping member 37.

Referring now to Fig. 6, the diagrammatic viewing will show the castering action which now occurs during this rearward movement. The centerline B which extends through the substantially vertical portion or turning portion of the spindle intersects the ground line ahead with respect to the direction of movement of the point of rolling resistance C or bearing contact point of the wheel with the ground. Thus the castering action of the wheel has been reversed and full castering of the wheels occurs during this reversal of movement. A represents the vertical centerline through the axis of the wheel which, as previously indicated, intersects the ground line at the point of rolling resistance C.

It can now be seen that a new novel castering construction has been provided which is especially adapted for vehicles where frequent reverses in the direction of movement have to be made. It is, of course, readily apparent that the type of construction shown may be employed with other types of vehicles and may be used for any wheeled carriage where castering is desired. Such may be the case in implement construction and particularly in the use of castering wheels with plows. It is also clearly apparent that it is unnecessary to provide a pair of wheels, since the castering results apparent may be equally well obtained by the use of a single wheel with the novel tiltable axle construction shown.

Applicant has thus fully achieved the desired objects of the invention and has provided a quickly reversible castering construction wherein the axle is tilted and the desirble features of a castering wheel are obtained without completely rotating the spindle of the wheel 180°. The geometry of the castering wheel structure is readily obtained by merely tilting the axle, this tilting action being accomplished automatically upon forward or rearward movement of the castering wheel structure. It is, of course, also apparent that the tilting action of the wheels may be accomplished manually or by power, the present linkage construction being such that this action is obtained automatically.

It must be understood that changes may be made in this design which do not depart from the spirit of the invention as disclosed or from the scope thereof as defined in the appended claims.

What is claimed is:

1. In a wheeled carriage having a supporting structure, a caster wheel construction comprising a transversely extending axle, a pair of laterally spaced socket members carried on said axle, a spindle carried by each socket, each spindle including a laterally extending portion and a substantially vertical portion, the substantially vertical portion being mounted in the socket for relative turning movement, a ground wheel journalled on the laterally extending portion of each spindle, a pair of laterally spaced axle supports connected to said axle, means shiftably connecting said axle to said supporting structure, said means including a plurality of laterally spaced forward links pivotally connected to the axle supports and to the said supporting structure, a plurality of laterally spaced rearward links pivotally connected to said axle supports and to said supporting structure, said axle and said sockets being adapted to pivot and tilt on said links in response to forward movement of said wheel whereby an extension of the axis of the substantially vertical portion of the spindle intersects the groundline forwardly of the bearing contact of the wheel with the ground, said axle and said socket being adapted to pivot and tilt on said links in response to rearward movement of said wheel whereby an extension of the axis of the substantially vertical portion of the spindle intersects the groundline rearwardly of the bearing contact of the wheel with the ground, and a telescoping strut pivotally connected to said axle and to said supporting structure for limiting the tilting movement of said axle and said socket.

2. In a wheeled carriage having a supporting structure, a caster wheel construction comprising a transversely extending axle, a pair of laterally spaced socket members carried on said axle, a spindle carried by each socket, each spindle including a laterally extending portion and a substantially vertical portion, the substantially vertical portion being mounted in the socket for relative turning movement, a ground wheel journalled on the laterally extending portion of each spindle, a pair of laterally spaced axle supports connected to said axle, means shiftably connecting said axle to said supporting structure, said means including a plurality of laterally spaced forward links pivotally connected to the axle supports and to the said supporting structure, a plurality of laterally spaced rearward links pivotally connected to said axle supports and to said supporting structure, said axle and said sockets being adapted to pivot and tilt on said links in response to forward movement of said wheel whereby an extension of the axis of the substantially vertical portion of the spindle intersects the groundline forwardly of the bearing contact of the wheel with the ground, said axle and said socket being adapted to pivot and tilt on said links in response to rearward movement of said wheel whereby an extension of the axis of the substantially vertical portion of the spindle intersects the groundline rearwardly of the bearing contact of the wheel with the ground, and means pivotally connected to said axle and to said supporting structure for limiting the tilting movement of said axle and said socket.

3. In a wheeled carriage having a supporting structure, a caster wheel construction comprising a transversely extending axle, a socket member carried on said axle, a spindle supported in said socket, said spindle including a portion extending laterally outwardly with respect to the direction of movement of said carriage, a substantially vertical portion on said spindle, said substantially vertical portion being mounted in said socket for relative turning movement about a substantially vertical axis, a ground wheel journalled on the laterally extending portion of the spindle, an axle support rigidly connected to said axle, means shiftably connecting said axle to said supporting structure, said means including a first link pivotally connected to said supporting structure and to said axle support, a second link spaced rearwardly of the first link, said second link being pivotally connected to said supporting structure and to said axle support, said axle and socket being tiltable on said links in response to forward movement of the wheel whereby the axis extension of the substantially vertical portion of the spindle intersects the groundline at a point forwardly of the bearing contact of the wheel with the ground, said socket and substantially vertical portion of the spindle being tiltable in response to rearward movement of said wheel whereby the substantially vertical axis extension of the substantially vertical portion of the spindle intersects the groundline rearwardly of the bearing contact of the wheel with the ground.

4. In a wheeled carriage having a supporting structure, a caster wheel construction comprising a transversely extending axle, a socket member carried on said axle, a spindle supported in said socket, said spindle including a portion extending laterally outwardly with respect to the direction of movement of said carriage, a substantially vertical portion on said spindle, said substantially vertical portion being mounted in said socket for relative turning movement about a substantially vertical axis, a ground wheel journalled on the laterally extending portion of the spindle, an axle support rigidly connected to said axle, means shiftably connecting said axle to said supporting structure, said means including a first link pivotally connected to said supporting structure and to said axle support, a second link spaced rearwardly of the first link, said second link being pivotally connected to said supporting structure and to said axle support, said axle and socket being tiltable on said links in response to forward movement of the wheel whereby the axis extended of the substantially vertical portion of the spindle intersects the groundline at a point forwardly of the bearing contact of the wheel with the ground, said socket and substantially vertical portion of the spindle being tiltable in response to rearward movement of said wheel whereby the substantially vertical axis extended of the substantially vertical portion of the spindle interesects the groundline rearwardly of the bearing contact of the wheel with the ground, and a telescoping strut pivotally connected to said axle and to said supporting structure for limiting the tilting movement of said axle and said socket.

5. In a wheeled carriage having a supporting structure, a caster wheel construction comprising a transversely extending axle, a socket member carried on said axle, a spindle supported in said socket, said spindle including a portion extending laterally outwardly with respect to the direction of movement of said carriage, a substantially vertical portion on said spindle, said substantially vertical portion being mounted in said socket for relative turning movement about a substantially vertical axis, a ground wheel journalled on the laterally extending portion of the spindle, an axle support rigidly connected to said axle, means shiftably connecting said axle to said supporting structure, said means including a first link pivotally connected to said supporting structure and to said axle support, a second link spaced rearwardly of the first link, said second link being pivotally connected to said supporting structure and to said axle support, said axle and socket being titlable on said links in response to forward movement of the wheel whereby the axis extended of the substantially vertical portion of the spindle intersects the groundline at a point forwardly of the bearing contact of the wheel with the ground, said socket and substantially vertical portion of the spindle being tiltable in response to rearward movement of said wheel whereby the substantially vertical axis extended of the substantially vertical portion of the spindle intersects the groundline rearwardly of the bearing contact of the wheel with the ground and means for limiting the tilting movement of said axle and said socket.

WALTER R. PETERSON.

References Cited in the file of this patent

UNITED STATES PATENTS

| Number | Name | Date |
|---|---|---|
| 288,687 | Barkow | Nov. 20, 1883 |
| 706,209 | Sumner | Aug. 5, 1902 |
| 1,793,353 | Benson | Feb. 17, 1931 |
| 2,187,136 | Mellinger | Jan. 16, 1940 |
| 2,254,532 | Knox | Sept. 2, 1941 |
| 2,345,945 | Miner | Apr. 4, 1944 |
| 2,377,641 | Miner | June 5, 1945 |
| 2,560,562 | Ferwerda | July 17, 1951 |